Oct. 27, 1959 A. V. BRANGAITIS 2,910,064
EMERGENCY EYE WASH
Filed March 31, 1958
Fig.1
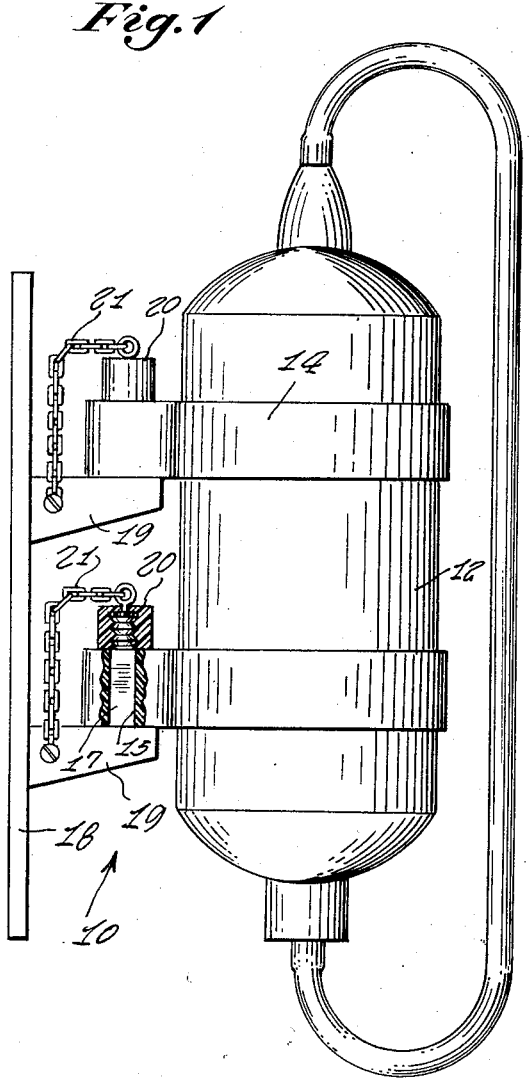
Fig.2
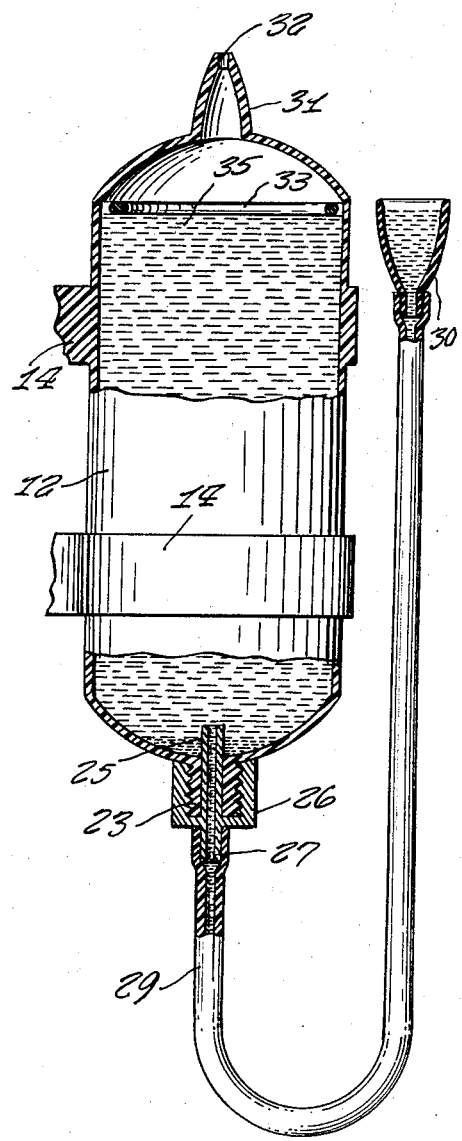
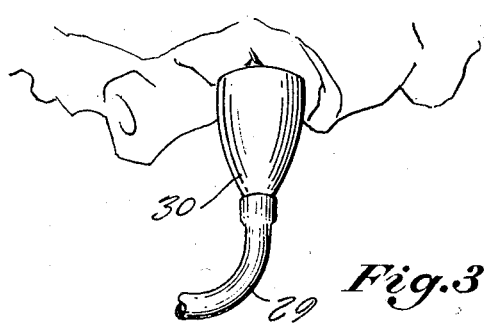
Fig.3
ANTHONY V. BRANGAITIS
INVENTOR
BY Carl Miller
ATTORNEY

2,910,064
EMERGENCY EYE WASH

Anthony V. Brangaitis, South Ozone Park, N.Y.

Application March 31, 1958, Serial No. 724,939

3 Claims.  (Cl. 128—249)

This invention relates to industrial safety equipment and, more particularly, to an emergency eye wash assembly.

In many industrial accidents, it is sometimes possible to prevent serious injury by the application of a suitable eye wash within a very short period of time following an accident. Often, however, such material for cleansing the eyes is not immediately available, whereby such eye injury cannot be avoided. It is therefore an object of the present invention to provide a completely self contained emergency eye wash unit that can be installed in various locations throughout an industrial plant in a constantly ready position for immediate use in the event of injury to any workman, that is extremely simple in construction, efficient in operation, and which can be immediately readied for use.

Another object of the present invention is to provide an emergency eye wash unit that is constantly filled with an eye wash solution and completely sealed against the entry of foreign matter so that it can be used at a moment's notice.

Still a further object of the present invention is to provide an emergency eye wash assembly of the type described that can be manufactured in large quantities at relatively low cost, so as to enable the placement of large numbers of such units throughout any single industrial plant.

All of the foregoing and still further objects and advantages of this invention will become apparent from a study of the following specification, taken in connection with the accompanying drawing, wherein:

Figure 1 is a side elevational view, with parts broken away, of an eye wash unit made in accordance with the present invention;

Figure 2 is a side elevational view of the apparatus shown in Figure 1, with the parts in an adjusted position ready for use; and Figure 3 is a fragmentary perspective view showing certain portions of the apparatus in actual use.

Referring now to the drawing, and more particularly to Figures 1 and 2 thereof, an emergency eye wash assembly 10 made in accordance with the present invention is shown to include a substantially cylindrical flask 12 having a plurality of annular bands 14 for supporting the flask in an upright position upon a bracket 18 that may be securely fastened to any wall or stationary object. Each band 14 is provided with an aperture 15 that slidably receives a threaded stud 17 carried upon vertically spaced apart arms 19 of the bracket 18. Internally threaded caps 20 secured to the bracket by means of individual chains 21 are releasably secured to the studs 17 so as to prevent accidental displacement of the flask from its mounting. However, such caps are instantly removed for dismounting the flask for use, refilling, or maintenance operations.

The lower end of a flask is provided with an externally threaded neck 23 which slidably receives a duct 25 that is integral with an internally threaded cap 26, and which extends upwardly inside of and above the bottom of the flask 12, so as to prevent any sediment and dirt that may have collected at the bottom of the flask from flowing into the tube 29. This cap is threadedly secured upon the neck 23 and is provided with a downwardly depending extension 27 which receives one end of a flexible tube 29. The opposite end of the tube 29 is connected to a hollow eye piece 30, whereby communication is provided between the eye piece and the interior of the flask through the duct piece 25, extension 27, and tube 29.

The upper end of the flask is provided with a substantially hollow conically shaped mounting plate 31 having an aperture 32 at the apex end thereof and communicating with the interior of the flask at the base end thereof. The shape of the mounting plug 31 is substantially the same as the interior of the eye piece 30, so that when the eye piece is not in use it is supported in sealed engagement upon the mounting plug 31, as shown in Figure 1. In this position, the entire unit is sealed against the entry of foreign matter and further prevents the evaporation of the rinse fluid 35 contained therewithin.

The flask and flexible tube are both preferably constructed of a transparent or translucent plastic material so that the contents thereof may be readily observed. A liquid level indicating ring 33 is floated upon the top surface of the fluid so as to provide a ready indication of the level of the fluid contained therewithin to serve notice when the flask requires the addition of more fluid.

In actual use, the parts may be normally supported in the position shown in Figure 1. As soon as an accident takes place, it only becomes necessary to remove the eye piece 30 and apply it to the injured eye, the liquid 35 contained within the flask thus being supplied to the injured eye through the tube and eye piece. The vent hole 32 in the upper end of the mounting plug 31 enables air to enter the interior of the flask to permit the liquid to flow outwardly through the bottom end thereof. After each use, the flask may be refilled through the hollow neck 23 by removing the cap 26.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. An emergency eye wash assembly comprising, in combination, a flask, portions of said flask defining openings at the top and bottom ends thereof, bracket means intermediate said top and bottom ends of said flask supporting it in an upright position, a flexible tube connected at one end to said bottom opening defining portions, and an eye rinse cup connected to the opposite end of said tube, wherein said top opening defining portion comprises a mounting for releasably supporting said eye rinse cup in sealing engagement therewith with said tube in communication with said opening.

2. An emergency eye wash assembly as set forth in claim 1, wherein said mounting comprises a substantially hollow conically shaped projection defining an opening at the apex thereof, and the base end of said projection communicating with the interior of said flask.

3. An emergency eye wash syringe assembly as set forth in claim 2, wherein said flask is of substantially hollow cylindrical shape and constructed of at least translucent material.

References Cited in the file of this patent

UNITED STATES PATENTS

| 143,928 | Potter | Oct. 21, 1873 |
| 2,529,365 | Barksdale | Nov. 7, 1950 |

FOREIGN PATENTS

| 125,795 | Great Britain | May 1, 1919 |
| 588,940 | Great Britain | June 6, 1947 |